United States Patent [19]

Valet et al.

[11] Patent Number: 5,350,449

[45] Date of Patent: Sep. 27, 1994

[54] COATING MATERIALS STABILIZED AGAINST LIGHT-INDUCED DEGRADATION

[75] Inventors: Andreas Valet, Eimeldingen, Fed. Rep. of Germany; Jean-Luc Birbaum, Fribourg; Mario Slongo, Tafers, both of Switzerland

[73] Assignee: Ciba-Geigy Corporation, Ardsley, N.Y.

[21] Appl. No.: 180,020

[22] Filed: Jan. 11, 1994

Related U.S. Application Data

[62] Division of Ser. No. 835,657, Feb. 13, 1992, Pat. No. 5,298,067.

[30] Foreign Application Priority Data

Feb. 21, 1991 [CH] Switzerland .............................. 527/91

[51] Int. Cl.$^5$ ............................................. C08K 5/3492
[52] U.S. Cl. ...................... 106/506; 106/400; 106/401; 252/403; 524/99; 524/100; 524/102; 524/103; 544/215
[58] Field of Search ................ 106/400, 401, 506; 252/403; 524/99, 100, 102, 103; 544/215

[56] References Cited

U.S. PATENT DOCUMENTS

| | | | |
|---|---|---|---|
| 3,118,887 | 1/1964 | Hardy et al. | 544/216 |
| 3,244,708 | 4/1966 | Duennenberger et al. | 544/216 |
| 3,268,474 | 8/1966 | Hardy et al. | 524/100 |
| 3,270,016 | 8/1966 | Duennenberger et al. | 544/211 |
| 3,284,394 | 11/1966 | Suen et al. | 524/100 |
| 3,423,360 | 1/1969 | Huber et al. | 526/261 |
| 4,619,956 | 10/1986 | Susi | 524/87 |
| 4,962,142 | 10/1990 | Migdal et al. | 524/100 |

FOREIGN PATENT DOCUMENTS

| | | |
|---|---|---|
| 0200190 | 11/1986 | European Pat. Off. . |
| 0389427 | 9/1990 | European Pat. Off. . |
| 0434608 | 6/1991 | European Pat. Off. . |
| 484695 | 12/1963 | Switzerland . |
| 480091 | 12/1969 | Switzerland . |

OTHER PUBLICATIONS

Heterocyclic Compounds, vol. 72, (1970) p. 365, 121590n.
Chem. Abstract 72, 79103d (1970).
H. Brunetti et al., Helv. Chim. Acta., 55, 1566 (1972).
Chem. Abst. 77, 101540w (1972).
Chem. Abst. 72, 121590n (1970).

*Primary Examiner*—Mark L. Bell
*Assistant Examiner*—Scott L. Hertzog
*Attorney, Agent, or Firm*—Luther A. R. Hall

[57] ABSTRACT

2-(2-Hydroxyphenyl)-4,6-diphenyl- and -4,6-di-p-tolyl-1,3,5-triazines are particularly suitable stabilisers, especially against light-induced degradation, for coating materials. They are superior in this respect to the corresponding 4,6-bis(2,4-dimethylphenyl) derivatives.

13 Claims, No Drawings

COATING MATERIALS STABILIZED AGAINST LIGHT-INDUCED DEGRADATION

This is a divisional of Ser. No. 07/835,657, filed Feb. 13, 1992, now U.S. Pat. No. 5,298,067.

The present invention relates to the stabilisation of coating materials by addition of a UV absorber of the class of the 2-(2-hydroxyphenyl)-1,3,5-triazines which are substituted in 4- and 6-position by phenyl or tolyl radicals, and to the use of such coating materials as automotive lacquers.

It is known that 2-(2-hydroxyphenyl)-1,3,5-triazines are UV absorbers which can be used as light stabilisers for organic materials, including plastics materials and paints and varnishes, (q.v. U.S. Pat. Nos. 3,118,887, 3,244,708, CH-A-480091). Their use in combination with sterically hindered amines is also known (U.S. Pat. No. 4,619,956). In the 2-(2-hydroxyphenyl)-1,3,5-triazines heretofore investigated, the 4- and 6-position of the triazine is usually substituted either by a 2-hydroxyphenyl group or by a 2,4-dimethylphenyl group.

Surprisingly, it has now been found that 2-(2-hydroxyphenyl)-1,3,5-triazines which carry in 4- and 6-position either a phenyl or p-tolyl group effect a better stabilising action than those hydroxyphenyltriazines which in 4- and 6-position carry a 2,4-dimethylphenyl group. They are also distinguished by high thermal and photochemical resistance.

The invention accordingly relates to a coating material stabilised against degradation induced by light, oxygen and heat, which material comprises
a) a film-forming binder,
b) as stabiliser, at least one hydroxyphenyltriazine of formula I

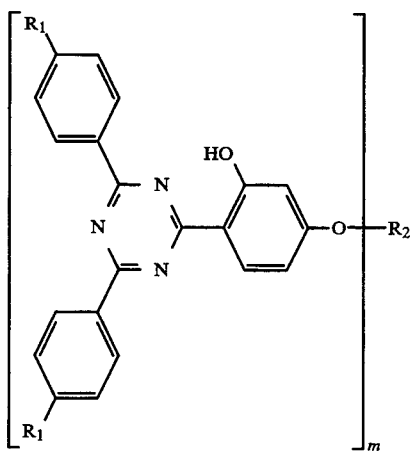

I wherein
$R_1$ is hydrogen or methyl,
m is 1 or 2, and $R_2$, when m is 1, is hydrogen, $C_1$–$C_{18}$alkyl, $C_1$–$C_{12}$alkyl which is substituted by halogen, hydroxyl, $C_1$–$C_{12}$alkoxy, —COOH, —COO($C_1$–$C_{12}$alkyl) or —CN, or is $C_2$–$C_6$alkenyl, $C_5$–$C_8$cycloalkyl, $C_6$–$C_{20}$alkylcycloalkyl, $C_7$–$C_{11}$phenylalkyl, —CH$_2$CO-phenyl or a group —CO—$R_3$, wherein $R_3$ is $C_1$–$C_{18}$alkyl, cyclohexyl or phenyl, and, when m is 2, is a radical —CO—$R_4$—CO— or —CO—NH—$R_5$—NH—CO—, wherein $R_4$ is $C_2$–$C_{10}$alkylene, phenylene, diphenylene or $C_2$–$C_6$alkenylene, and $R_5$ is $C_4$–$C_{10}$alkylene, phenylene, tolylene, diphenylmethane or a group

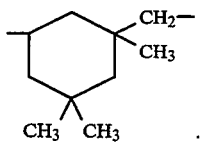

The film-forming binder of component a) may be a thermoplastic or thermosetting resin, especially a thermosetting resin. Typical examples of such resins are alkyd, acrylic, polyester, phenol, melamine, epoxy and polyurethane resins and mixtures thereof.

Illustrative examples of coating materials containing special binders are:

1. paint or varnish compositions based on cold- or hot-crosslinkable alkyd, acrylate, polyester, epoxy or melamine resins or mixtures of said resins, to which an optional acid curing catalyst is added;
2. two-component polyurethane paint or varnish compositions based on hydroxylated acrylate, polyester or polyether resins and aliphatic or aromatic polyisocyanates;
3. single component polyurethane paint or varnish compositions based on blocked polyisocyanates which are deblocked during stoving;
4. two-component paint or varnish compositions based on (poly)ketimines and aliphatic or aromatic polyisocyanates;
5. two-component paint or varnish compositions based on (poly)ketimines and an unsaturated acrylate resin or a polyacetoacetate resin or a methyl acrylamidoglycolate methyl ester;
6. two-component paint or varnish compositions based on carboxyl or amino group containing polyacrylates and polyepoxides;
7. two-component paint or varnish compositions based on anhydride group containing acrylate resins ad a polyhydroxy or polyamino component;
8. two-component paint or varnish compositions based on (poly)oxazolidines and anhydride group containing acrylate resins or unsaturated acrylate resins or aliphatic or aromatic polyisocyanates;
9. two-component paint or varnish compositions based on unsaturated polyacrylates and polymalonates;
10. thermoplastic polyacrylate paint or varnish compositions based on thermoplastic acrylate resins or not self-crosslinking acrylate resins in conjunction with etherified melamine resins;
11. paint or varnish systems based on siloxane-modified or fluorine-modified acrylate resins.

The stabilisers of formula I are known compounds or compounds which can be prepared by methods analogous to known ones. They can normally be prepared from the compounds of formula I, wherein $R_2$ is hydrogen, by introducing the substituent $R_2$, conveniently by etherification, esterification, hydroxyalkylation or carbamoylation of the phenolic hydroxyl group in 4-position of the 2-hydroxyphenyl ring. The 2-hydroxy group does not react in this process under appropriate reaction conditions because it is blocked by a hydrogen bond. Such methods are described in U.S. Pat. Nos. 3,118,887, 3,244,708 or 3,423,360.

The starting materials, compounds of formula I wherein $R_2$ is hydrogen, can be prepared by reacting the corresponding diarylchlorotriazines with resorcinol under Friedel-Crafts conditions (Helv. Chim. Acta 55, 1566 (1972)) or from benzamidine and phenyl resorcylate (U.S. Pat. No. 3,118,887).

$R_2$ or $R_3$ as $C_1$–$C_8$alkyl, in formula I may be linear or branched alkyl, typically methyl, ethyl, n-propyl, isopropyl, n-butyl, sec-butyl, tert-butyl, pentyl, hexyl, heptyl, octyl, 2-ethylhexyl, 1,1,3,3-tetramethylbutyl, decyl, undecyl, dodecyl, tetradecyl, hexadecyl or octadecyl.

$R_2$ as $C_1$–$C_{12}$alkyl which is substituted by halogen, hydroxyl, $C_1$–$C_{12}$alkoxy, —COOH, —COO($C_1$–$C_{12}$alkyl) or —CN may typically be 2-chloroethyl, 2,2,2-trifluoroethyl, 2-hydroxyethyl, 2-hydroxypropyl, 2-methoxyethyl, 2-isopropoxyethyl, 2-butoxyethyl, 2-dodecyloxyethyl, 2-ethoxypropyl, carboxymethyl, ethoxycarbonylmethyl, butoxycarbonylmethyl, octyloxycarbonylmethyl, dodecyloxycarbonylmethyl, 2-(methoxycarbonyl)ethyl, 2-(hexyloxycarbonyl)ethyl, 2-(decyloxycarbonyl)ethyl, 2-(butoxycarbonyl)propyl or 2-cyanoethyl.

$R_2$ as $C_2$–$C_6$alkenyl is preferably allyl or methallyl. $R_2$ as $C_5$–$C_8$cycloalkyl is preferably cyclohexyl. $R_2$ as $C_6$–$C_{20}$alkylcycloalkyl is preferably methylcyclohexyl. $R_2$ as $C_7$–$C_{11}$phenylalkyl is preferably benzyl.

$R_4$ as $C_2$–$C_6$alkylene is preferably unbranched alkylene, typically ethylene, trimethylene, tetramethylene, pentamethylene, hexamethylene, octamethylene or decamethylene. $R_5$ as $C_4$–$C_{10}$alkylene may be branched or unbranched alkylene, such as tetramethylene, pentamethylene, hexamethylene, octamethylene or decamethylene, 2,2-dimethyltrimethylene or 1,3,3-trimethyltetramethylene. $R_4$ as $C_2$–$C_6$alkenylene is preferably 1,2-vinylene.

Component b) is preferably a compound of formula I, wherein $R_1$ is hydrogen or methyl, m is 1, $R_2$ is $C_1$–$C_{18}$alkyl, $C_5$–$C_8$cycloalkyl, $C_7$–$C_{11}$phenylalkyl, —CH$_2$CO—phenyl or $C_1$–$C_4$alkyl which is substituted by —COO($C_1$–$C_{12}$alkyl).

The coating materials of this invention may contain further stabilisers, conveniently the following classes of stabilisers:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol.

1.2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol.

1.3. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol).

1.4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzl)-4-nonylphenol], 2,2'-methylenebis[6-(α,α-dimethylbenzyl)-4-nonylphenol], 4,4'-methylenebis(2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-hydroxy-5'-methylbenzyl)-6-tert-butyl-4methylphenyl]terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-bis(tert-butyl-4-hydroxybenzylmercaptoacetate), bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl)isocyanurate.

1.6. Acylaminophenols, for example 4-hydroxylauranilide, 4-hydroxystearanilide, 2,4-bis (octylmercapto)-6-(3,5-di-tert-butyl-4-hydroxyanilino)-s-triazine, octyl N-(3,5-di-tert-butyl-4-hydroxyphenyl) carbamate.

1.7. Esters of β-(3,5-di-tert-butyl-4-hydroxyphenyl)-propionic acid with mono- or polyhydric alcohols, e.g. with methanol, octadecanol, 1,6-hexanediol, neopentyl glycol, triethylene glycol, pentaerythritol, tris(hydroxyethyl) isocyanurate, thiodiethylene glycol, N,N'-bis(-hydroxyethyl)oxalodiamide. 1.8. Esters of β-(5-tert-butyl-4-hydroxy-3-methyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.

1.9. Esters of β-(3,5-dicyclohexyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.

1.10. Amides of β-(3,5-di-tert-butyl-4-hydroxyphenyl)propionic acid e.g. N,N'-bis (3,5-di-tert-butyl-4-hydroxyphenylpropionyl)hexamethylenediamine, N,N'-bis(3,5-di-tert-butyl-4-hydroxyphenylpropionyl)-trimethylenediamine, N,N'-bis(3,5-di-tert-butyl-4-hydroxyphenylpropionyl)hydrazine.

2. UV absorbers and light stabilisers 2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

2.3. Esters of substituted and unsubstituted benzoic acids, for example, 4-tert-butylphenyl salicylate, phenyl salicylate, octylphenyl salicylate, dibenzoylresorcinol, bis(4-tert-butylbenzoyl)-resorcinol, benzoylresorcinol, 2,4-di-tert-butylphenyl 3,5-di-tert-butyl-4-hydroxybenzoate and hexadecyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano- β-methyl-p-methoxy- cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzyl-phosphonic acid monoalkyl esters, e.g. of the methyl or ethyl ester, nickel complexes of ketoximes, e.g. of 2-hydroxy-4-methyl-phenyl undecyl ketoneoxime, nickel complexes of 1-phenyl-4-lauroyl-5-hydroxypyrazole, with or without additional ligands.

2.6. Sterically hindered amines, such as bis(2,2,6,6-tetramethylpiperidyl)sebacate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, condensate of 1-hydroxyethyl-2,2,6,6-tetramethyl-4-hydroxypiperidine and succinic acid, condensate of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)-nitrilotriacetate, tetrakis(2,2,6,6-tetramethyl-4-piperidyl)-1,2,3,4-butanetetraoate, 1,1'-(1,2-ethanediyl)-bis(3,3,5,5-tetramethyl-piperazinone).

2.7. Oxalyl diamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butoxanilide and mixtures of ortho- and para-methoxy-disubstituted oxanilides and mixtures of o- and p-ethoxydisubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxy-phenyl)-4,6-bis(2,4-dimethylphenyl)-1,3,5-triazine, 2-(2,4-dihydroxy-phenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine.

3. Metal deactivators, for example N,N'-diphenyloxalyl diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-ditertbutylphenyl) pentaerythritol diphosphite, tristearyl sorbitol triphosphite, tetrakis-(2,4-di-tert-butylphenyl) 4,4'-biphenylene diphosphonite, 3,9-bis(2,4-di-tert-butylphenoxy)-2,4,8,10-tetraoxa-3,9-diphosphaspiro[5.5]undecane.

The coating materials preferably contain as further stabiliser a light stabiliser of the type of the sterically hindered amines, preferably a light stabiliser which contains at least one group of formula

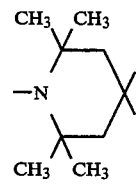

Examples of such light stabilisers are listed above under item 2.6.

The subject of this invention includes a method of stabilising a coating material against the deleterious effects of light, oxygen and heat, which method comprises adding to said coating material at least one hydroxyphenyltriazine of formula I.

The amount of stabiliser added will depend on the type of binder and on the envisaged end use of the coating material. The coating material will preferably contain 0.1 to 5% by weight of a stabiliser of formula, based on the amount of binder [component a)].

If a sterically hindered amine is also added, the amount thereof will preferably be 0.01 to 2% by weight, based on the binder [component a)].

Further preferred co-stabilisers are the light stabilisers of the type of the 2-(2'-hydroxyphenyl)benzotriazoles.

The coating materials can contain an organic solvent, typically an aromatic or aliphatic hydrocarbon, a ketone, alcohol, an ester or ether or a mixture thereof. The coating materials may be in the form of aqueous dispersions or solutions or they may also be free from solvents or dispersants. The last mentioned case applies where the coating materials are in the form of powder coating compositions or photocurable coating compositions. Aqueous dispersions or solutions are used typically for electrophoretic coatings.

The coating materials may contain a pigment, conveniently an organic or inorganic pigment or a metallic pigment. The coating materials may, however, also contain no pigment (clear varnishes).

The coating materials may contain the further additives conventionally used in coating technology, typically fillers, levelling agents, thixotropic agents, dispersants, adhesion promoters, corrosion inhibitors or curing catalysts.

The coating materials can be applied as a single layer or two-layer coating. In the case of two-layer systems, the stabilised coating of the invention is preferably applied as non-pigmented topcoat.

The coating materials can be applied to different substrates, including metal, wood, plastics or ceramics. Application to these substrates can be made by the techniques customarily used in the coating art, typically by spreading, spraying, casting, dip-coating, electrophoresis or spin-coating.

The coating materials of the invention are particularly suitable for use as automotive lacquers in view of the exacting requirements made of the light stability of such lacquers.

The invention is illustrated by the following non-limitative Examples in which parts and percentages are by weight.

Example

A clear lacquer is prepared from
54.5 parts of an acrylic resin (Uracron ® 2263 XB, DSM Resin BV) (50% solution in xylene)

16.3 parts of a melamine resin (Cymel®237, Amer. Cyanamid Co.) (90% solution)

19.4 parts of xylene 5.5 parts of butyl glycol acetate 3.3 parts of butanol and 1.0 part of a levelling agent (Baysilon®A, Bayer AG) (1% solution in xylene).

The UV absorbers listed in Tables 1–3 are dissolved in xylene and added to the clear lacquer an amount of 1.5%, based on solids.

The lacquer samples so prepared are diluted with a mixture of xylene, butanol and butyl glycol acetate (13:6:1) to a sprayable consistency and sprayed onto a prepared aluminium sheet (coil coat, automotive filler, silver metallic primer lacquer) and glass plates. After storage for 15 minutes, the samples are cured at 130° C. for 30 minutes.

The samples are then subjected to weathering in an Atlas UVCON apparatus (UVB-313 lamps) at a cycle of 8 h UV radiation at 70° C. and 4 h condensation at 50° C.

[Structure: Ar-substituted triazine with HO-phenyl-OR group]

| | | |
|---|---|---|
| UV-1 | R = $C_8H_{17}$ | Ar = phenyl |
| UV-2 | R = $C_8H_{17}$ | Ar = p-tolyl |
| UV-3 | R = $C_8H_{17}$ | Ar = 2,4-dimethylphenyl (comparison) |
| UV-4 | R = $C_3H_7$ | Ar = phenyl |
| UV-5 | R = $C_3H_7$ | Ar = 2,4-dimethylphenyl (comparison) |
| UV-6 | R = $C_{12}H_{25}$ | Ar = phenyl |
| UV-7 | R = $C_{12}H_{25}$ | Ar = p-tolyl |
| UV-8 | R = $C_{12}H_{25}$ | Ar = 2,4-dimethylphenyl (comparison) |

The surface gloss of the samples on silver metallic primer lacquer is measured at regular intervals (20° gloss according to DIN 67530). The results of these measurements are reported in Tables 1 and 2. The thickness of the lacquer film of the samples in Table 1 after curing is about 20 μm and of the samples in Table 2 about 43 μm.

Furthermore, at the samples sprayed on glass plates (thickness of the lacquer film after curing about 20 μm) the loss of UV absorber after 800 hours of weathering is measured spectroscopically. The results of these measurements are shown in table 3.

TABLE 1

20° gloss according to DIN 67530 before and after weathering, about 20 μm clear lacquer on silver metallic primer lacquer.

| Stabiliser | 20° gloss after | | |
|---|---|---|---|
| (1.5%) | 0 h | 3600 h | 5000 h weathering |
| UV-1 | 86 | 47 | 36 |
| UV-2 | 86 | 75 | 55 |
| UV-3 | 84 | 24 | <24 |
| UV-4 | 82 | 67 | 38 |
| UV-5 | 83 | 47 | <25 |
| UV-7 | 84 | 68 | 34 |
| UV-8 | 85 | 53 | <25 |

TABLE 2

20° gloss according to DIN 67530 before and after weathering, about 43 μm clear lacquer on silver metallic primer lacquer.

| Stabiliser | 20° gloss after | | |
|---|---|---|---|
| (1.5%) | 0 h | 3200 h | 4400 h weathering |
| UV-1 | 89 | 52 | 56 |
| UV-3 | 88 | 7 | <7 |
| UV-4 | 89 | 67 | 59 |
| UV-5 | 88 | 64 | 36 |

TABLE 3

Loss of UV absorber after weathering, measured at wavelength $\lambda_{max}$/nm, glass plate substrate.

| Stabiliser (1.5%) | $\lambda_{max}$/nm | loss (%) of UV absorber after 800 h weathering |
|---|---|---|
| UV-1 | 342 | 1.9 |
| UV-3 | 338 | 8.0 |
| UV-7 | 340 | 3.8 |
| UV-8 | 338 | 9.5 |

What is claimed is:

1. A coating material stabilised against degradation induced by light, oxygen and heat, which comprises
   a) a film-forming binder,
   b) as stabiliser, at least one hydroxyphenyltriazine of formula I

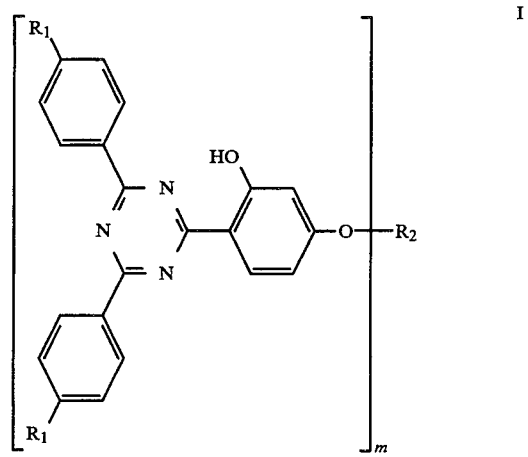

wherein $R_1$ is hydrogen or methyl, m is 1, and $R_2$ is $C_1$–$C_{12}$alkyl which is substituted by hydroxyl, by $C_1$–$C_{12}$alkoxy or by both hydroxyl and by $C_1$–$C_{12}$alkoxy.

2. A coating material according to claim 1, wherein component a) is selected from the group consisting of alkyd, acrylic, polyester, phenol, melamine, epoxy and polyurethane resins and mixtures thereof.

3. A coating material according to claim 1, comprising as further stabiliser a light stabiliser which is a sterically hindered amine.

4. A coating material according to claim 3, comprising as further stabiliser a light stabiliser which contains at least one group of formula

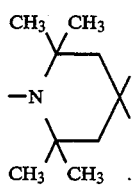

5. A coating material according to claim 1, which contains an organic solvent.

6. A coating material according to claim 1, which contains a pigment.

7. A coating material according to claim 1, which comprises 0.1 to 5% by weight of a stabiliser of formula I, based on component a).

8. A coating material according to claim 3, which comprises 0.01 to 2% by weight of a light stabiliser which is a sterically hindered amine, based on component a).

9. A coating material according to claim 1, which comprises as further stabiliser a light stabiliser which is a 2-(2'-hydroxyphenyl)benztriazole.

10. A coating material according to claim 1, which is an aqueous dispersion or solution of a) and b).

11. A coating material according to claim 1, which is an automotive lacquer.

12. A coating material according to claim 1, which is non-pigmented.

13. A method of stabilising a coating material against the deleterious effects of light, oxygen and heat, which method comprises
adding to said coating material at least one hydroxyphenyltriazine of formula I

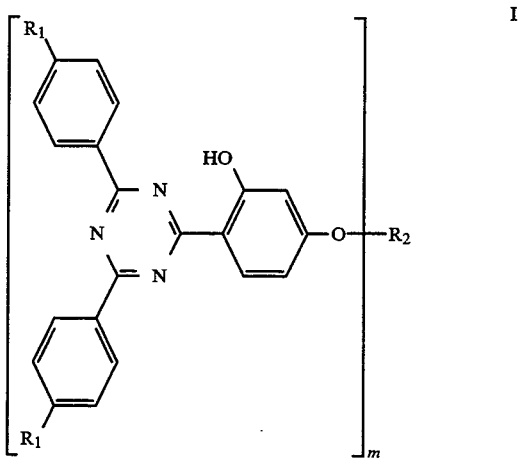

wherein
$R_1$ is hydrogen or methyl,
m is 1, and
$R_2$ is $C_1$-$C_{12}$alkyl which is substituted by hydroxyl, by $C_1$-$C_{12}$alkoxy or by both hydroxyl and by $C_1$-$C_{12}$alkoxy.

* * * * *